United States Patent
Allik et al.

Patent Number: 5,943,358
Date of Patent: Aug. 24, 1999

[54] NON-CONFOCAL UNSTABLE LASER RESONATOR AND OUTCOUPLER

[75] Inventors: Toomas H. Allik, Alexandria; Suresh Chandra, Springfield; J. Andrew Hutchinson, Lorton, all of Va.

[73] Assignee: The United States of America as represented by the Secretary of the Army, Washington, D.C.

[21] Appl. No.: 08/890,531

[22] Filed: Jul. 9, 1997

Related U.S. Application Data

[66] Substitute for application No. 08/507,879, Jul. 27, 1995, abandoned.

[51] Int. Cl.$^6$ ........................................................ H01S 3/08
[52] U.S. Cl. .............................. 372/95; 372/101; 372/108
[58] Field of Search ................................ 372/95, 101, 108

[56] References Cited

U.S. PATENT DOCUMENTS 5,557,630  9/1996  Scaggs ....................................... 372/95

FOREIGN PATENT DOCUMENTS

3728129 A1  3/1988  Germany .................................. 372/95

*Primary Examiner*—Rodney Bovernick
*Assistant Examiner*—Robert E. Wise
*Attorney, Agent, or Firm*—Milton W. Lee; John E. Holford; Alain L. Bashore

[57] ABSTRACT

An unstable laser resonator geometry with a gradient reflectivity mirror (GRM) and external lens, or a gradient reflectivity mirror-lens (GRML), achieving a vast improvement in the intrinsic divergence and brightness of the output laser beam.

8 Claims, 5 Drawing Sheets

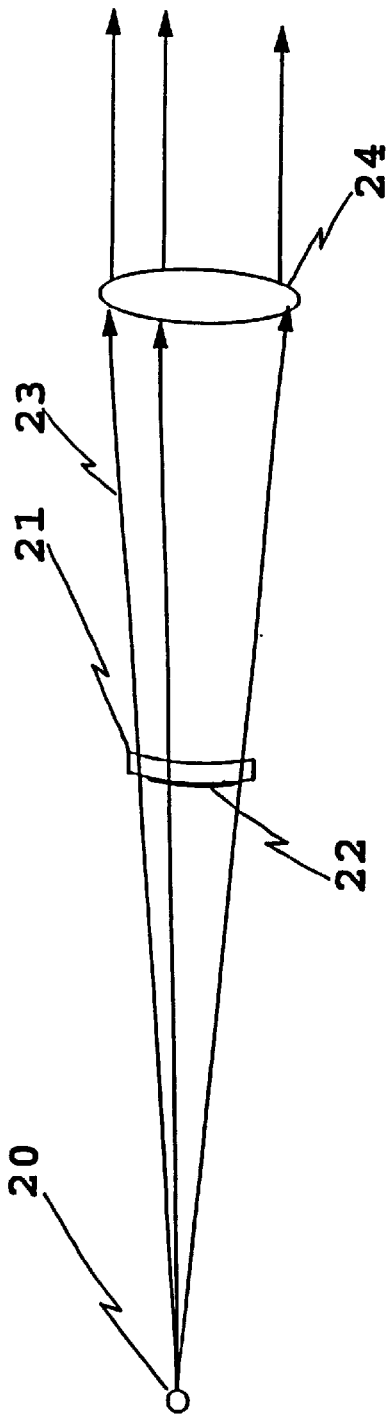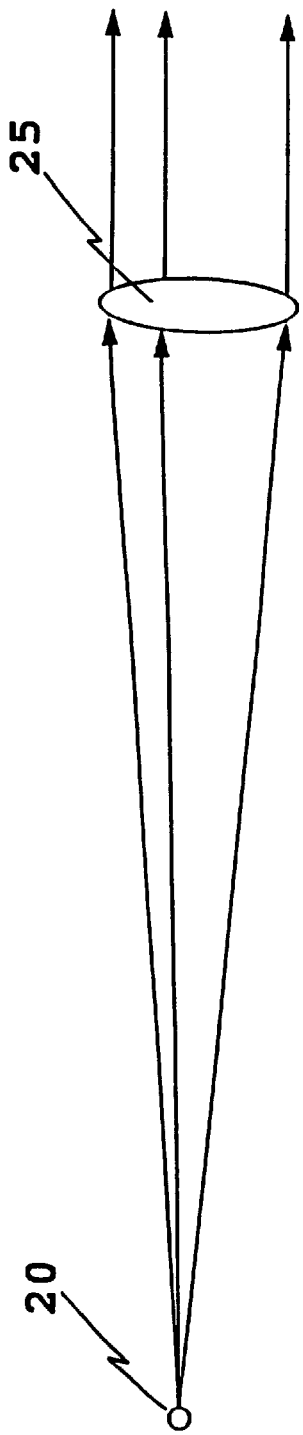
FIG. 2a
FIG. 2b

NON-CONFOCAL UNSTABLE LASER RESONATOR AND OUTCOUPLER

RELATED APPLICATION

This is a substitute application for patent application Ser. No. 08/507,879 filed Jul. 27, 1995, now abandoned.

BACKGROUND OF THE INVENTION

1. Field of the Invention

The present invention generally relates to dye laser resonators and to outcouplers; and more specifically, to non-confocal unstable dye laser resonators and a new type of outcoupler mirror device.

2. Description of Prior Art

Dye lasers form a very important class of lasers because they provide easily selectable wavelength laser radiation in the visible and near visible regions of the spectrum. The gain material of dye lasers has traditionally been liquid solutions of dyes. Dye doped plastics were tested but not found practical because of easy damage to the material. Recent advances have lead both to a better class of dyes as well as to damage resistant plastics so that dye doped plastics have now become practical laser gain materials. Some of the dye lasers—both liquid and solid state—have been demonstrated to be very efficient wavelength converters when pumped with a shorter wavelength laser such as the frequency doubled Nd:YAG laser at 532 nm wavelength. Conversion efficiencies as high as 85% have been demonstrated. In order for a laser to be most useful, energy efficiency is often not enough or even most important. What is often most important is the "brightness" of the laser which requires a low intrinsic divergence of the laser beam.

The typical dye laser resonator is plano-parallel where the dye gain material is placed between two parallel mirrors. One of these mirrors is fully reflecting at the dye laser wavelength and the other mirror (called "output coupler" or "outcoupler") is partly reflecting and partly transmitting. Such a resonator is highly efficient. The problem, however, is the poor beam divergence-diameter product which may be 100 mm-milliradians (or worse).

The confocal resonator, where the resonator length (d) equals the difference in the focal lengths of the two mirrors, is also commonly used. Confocal resonators are not compact and tend to be moderately long (>>10 cm) where all laser beams within and outside the laser cavity are collimated. Increased length means a smaller Fresnel number, $N=a^2/ld$, where a is the cavity gain aperture radius, and l is the lasing wavelength. The beam divergence is reduced in smaller Fresnel number cavities as the high order modes "diverge" out of the gain volume faster than the low order modes because of diffraction. In a confocal unstable resonator the instability upon each successive round trip occurs only in the size of the beam. The beam directionality, on the other hand, is stable, with the propagation vector being parallel to the resonator axis and the output wavefront is planar.

Mirror technology has also advanced in part due to laser design optimization of the prior art. Signal and energy pathways require movement of such pathways in one direction while reflection/redirection in another direction; a usual requirement in most laser design schemes. Partially reflective mirrors (one class of what is known in the art as: path altering elements) are especially effective in laser cavity resonators as they allow the characteristic oscillating optical field between mirrors, yet by virtue of the partially reflective mirror allows for a resultant emission out of that cavity mirror end. Gradient reflectivity mirror (GRM) unstable resonators have been developed to try to achieve a high brightness yield by manipulation of beam output pathways. The mirror that comprises one side of the cavity resonator is the GRM, which is designed as a partial reflective mirror having selected reflected surfaces thereon. It should be noted that whereas GRM's have been used with several other types of lasers, they have not been used with solid state dye lasers before. Further, resonators using a GRM are generally of confocal configuration (mirror separation equal to the difference in the focal lengths of the two mirrors) which renders them moderately long (>>10 cm). Decreasing the resonator length by bringing the mirrors closer together results in a highly diverging beam.

While the prior art has reported using dye lasers none have established a basis for a specific apparatus that is dedicated to the task of resolving the particular problem at hand. What is needed in this instance is a new non-confocal unstable laser resonator resulting in compactness and high brightness.

SUMMARY OF THE INVENTION

It is therefore the object of the invention to provide a new laser resonator arrangement and technique whereby there is achieved compactness and high brightness.

It is another object of the invention to provide a new outcoupler mirror device whereby there is achieved a laser resonator that is compact and high brightness.

According to the invention, an unstable resonator configuration and technique is disclosed resulting in a resonator that is compact and highly nonconfocal. The compact non-confocal placement of resonator mirrors would normally cause the output beam to diverge as described in the prior art. The present invention utilizes a novel combination of a GRM and external lens thereby to yield collimated output. The GRM and external lens can also be combined to form a "gradient reflectivity mirror-lens" or hereafter called "GRML". The GRML functions both as a GRM but also as the lens to restore a collimated output. The curvature of the lens portion of the second surface of the GRML (or the external lens if a GRM is utilized) is calculated so as to provide collimated output for a desired compact length resonator.

BRIEF DESCRIPTION OF THE DRAWINGS

The foregoing and other objects, aspects and advantages will be better understood from the following detailed description of a preferred embodiment of the invention with reference to the drawings, in which:

FIG. 2a shows an optical ray trace diagram superimposed over a GRM and external lens.

FIG. 2b shows an optical ray trace diagram superimposed over a GRML.

FIG. 3 is a general non-confocal unstable laser resonator arrangement utilizing the GRM and lens of FIG. 2a.

DETAILED DESCRIPTION OF A PREFERRED EMBODIMENT OF THE INVENTION

The compact non-confocal placement of resonator mirrors would normally cause the output beam to diverge (un-collimated) as described in the prior art. The present invention utilizes a novel combination of a GRM and external lens thereby to yield collimated output. The GRM and external lens can also be combined to form a "gradient reflectivity mirror-lens" or hereafter called "GRML". The GRML functions both as a GRM but also as the lens to restore a collimated output. The curvature of the lens portion of the second surface of the GRML (or the external lens if a GRM is utilized) is calculated so as to provide collimated output for a desired compact length resonator. One laser is considered more compact than another if the Fresnel number is larger than the other.

Figure 1:
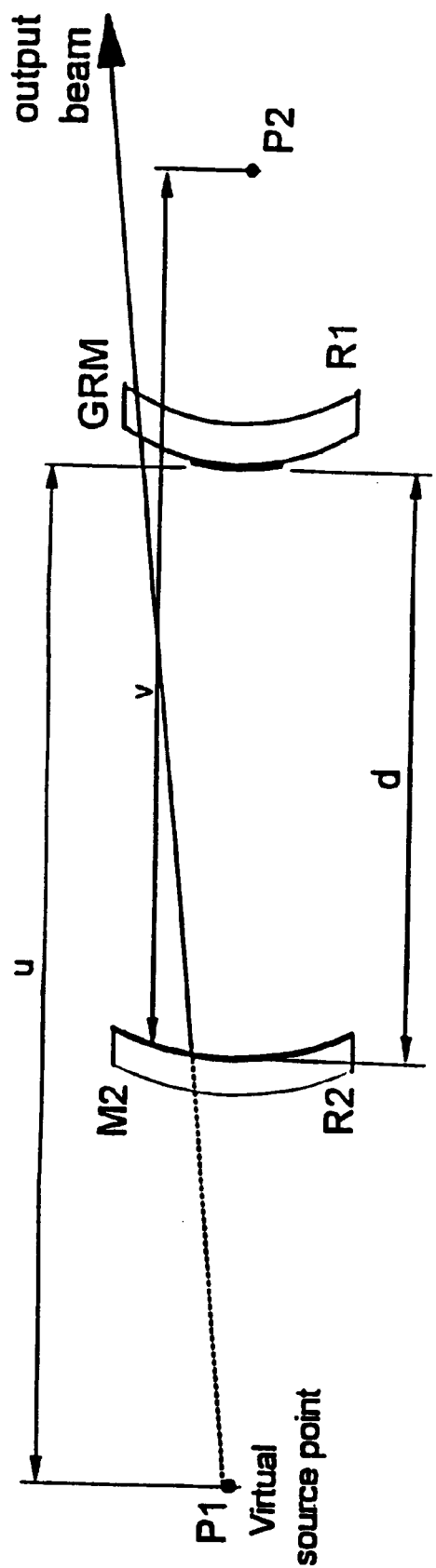
FIG. 1 is a diagram of generic nonconfocal resonator where the GRM and the rear mirror are separated by an arbitrary distance d.

Referring now to the drawings, and more particularly to FIG. 1 where is shown a diagram of optical dimensions utilized for a generic non-confocal resonator. Two conjugate virtual source points, P1 and P2, are defined for waves propagating in the two opposite directions within the laser cavity defined by GRM-lens M1 and mirror M2. Refraction is not included in this derivation. Rays traveling from point P1 towards the output of GRM-lens M1 are (partially) reflected by the mirror M2 so as to form a (virtual) image at P2. Rays from P2, in turn are reflected from M2 to form an image at P1. By convention the mirror radii of curvature are taken as positive if they are concave inward towards the resonator. Distances referenced from mirror M2 are considered positive when they are to the right of M2. Distances referenced from mirror M1 are considered positive when they are to the left of M1. If u represents the distance of point P1 from the GRM-lens M1 and v the distance of P2 from M2, and d is the resonator length, the following relations hold:

$$2/R1 = 1/u + 1/(d-v) \quad (1)$$

Similarly, $$2/R2 = 1/v + 1/(d-u) \quad (2)$$

and, the round trip magnification M, will be given by $$M = [((2u/R1)-1)][((2v/R2)-1)] \quad (3)$$

where R1 and R2 represent the radii of curvature of mirrors M1 and M2 respectively. The goal of these calculations is to find u, the distance of the virtual source point P1 from the output GRML, so the appropriate lens may be used in the GRML configuration to collimate the output.

For a simple resonator where the high reflector, M2, is planar (R2=∞) then P2 becomes the plane mirror reflection of P1 in M2. Then we have $$v = u - d \quad (4)$$

$$u^2 - 2du + d(R1) = 0 \quad (5)$$

and $$M = 1 - 2u/R1 \quad (6)$$

The spherical wavefront is thus collimated outside the cavity by using the appropriate lens in the GRML element.

FIGS. 2a and 2b there is depicted optical ray-trace plots superimposed over a separate GRM and a separate lens, and a GRML respectively. Point 20 is the theoretically calculated virtual source point. In FIG. 2a, GRM 21 allow to pass, outside of reduced reflectivity surface 22, light rays 23 shown as a diverging output. External lens 24 constructed as a biconvex lens collimates light rays 23 to yield a collimated output. In FIG. 2b GRML 25 is utilized which also produces a collimated output. While the preferred embodiment discloses the GRML as biconvex, it is understood that the invention is not limited to such geometry, only that both sides of the GRML must at least form a positive lens.

Figure 3:
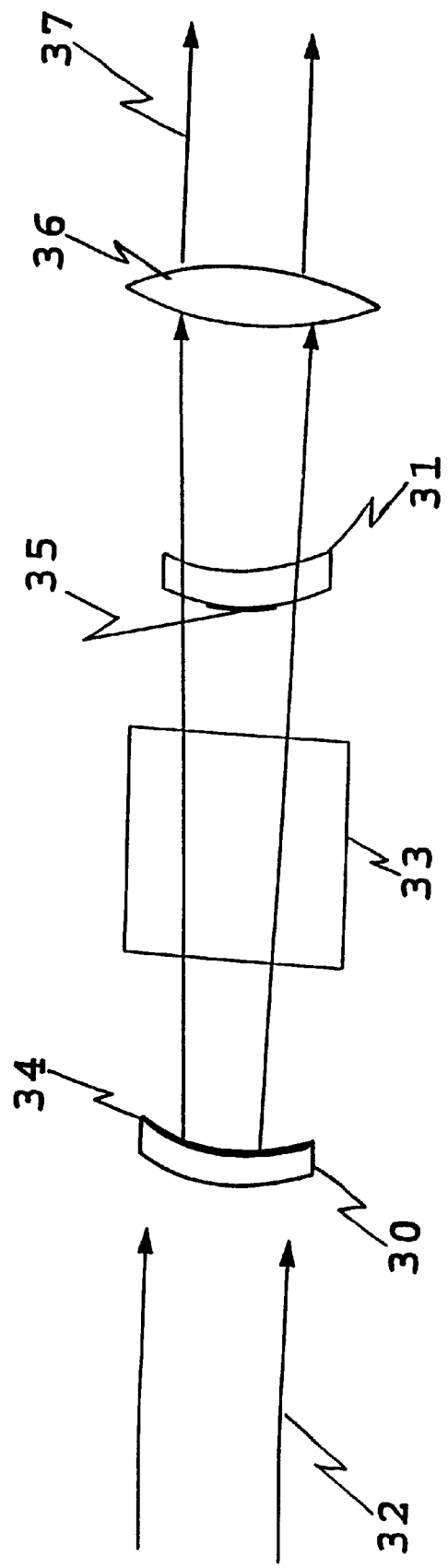
Figure 4:
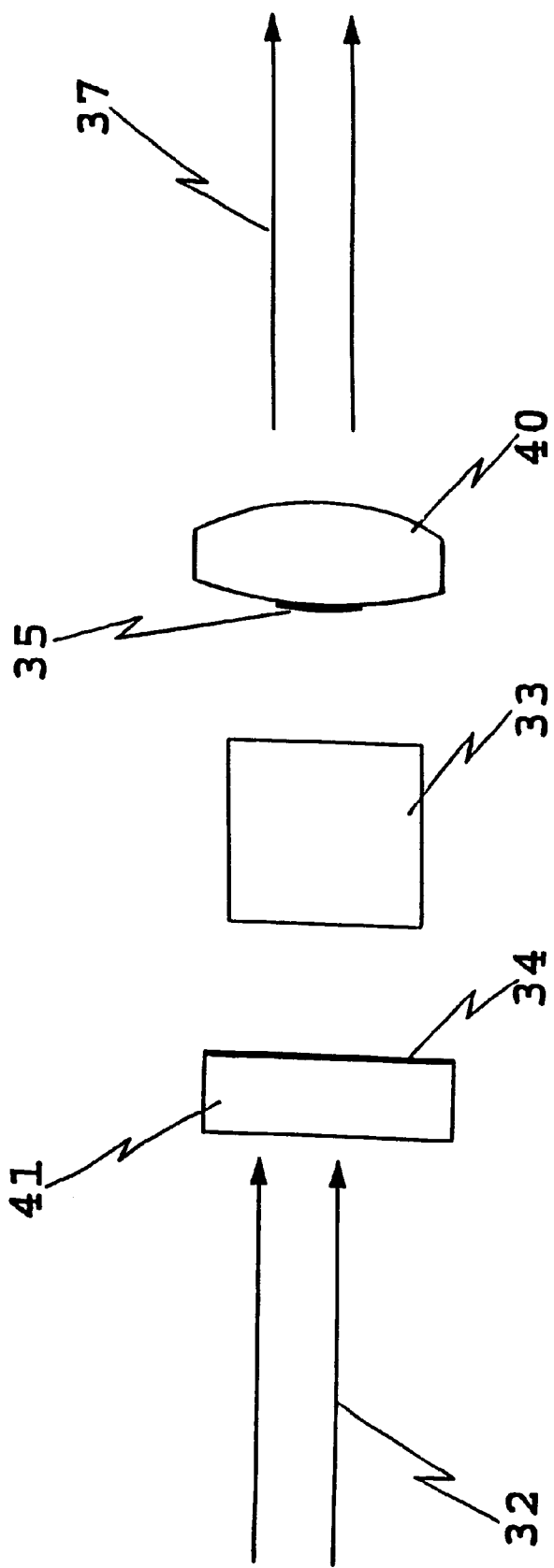
FIG. 4 is the invention non-confocal unstable resonator incorporating the GRML of FIG. 2b.

FIGS. 3 and 4 are functional diagrams of the non-confocal unstable laser resonator arrangement and an alternative embodiment. In the embodiment shown in FIG. 3, cavity space is defined in between mirrors 30 and 31. Pump energy 32 is input into the dichroic rear mirror 30, so that dye 33 is energized through population inversion. Oscillating optical field movement occurs between the reflecting surface 34 of mirror 30 and reflective surface 35 of GRM 31. When the beam diameter is sufficiently large, the energy is passed through reduced reflective areas of mirror 31. Beam output is then collimated by lens 36 and thus output as collimated laser light 37 with small beam divergence and high brightness. For the purpose of this invention divergence is measured in mm-mrad.

In the alternative embodiment shown in FIG. 4, GRML 40 is utilized along with flat mirror 41 to form the laser cavity. Pump energy 32 is input into the flat mirror 41, so that dye 33 is energized through population inversion. Oscillating optical field movement occurs between the reflecting surface 34 of mirror 30 and reflective surface 35 of GRML 40. When the beam width is sufficiently large, the energy is passed through reduced reflective areas of mirror 40, and also collimated so that there is output collimated laser light 37 with small beam divergence and high brightness.

A preferred working embodiment, is described utilizing the alternative embodiment shown in FIG. 4. A GRM fabricated on a 100 cm radius of curvature convex surface. The GRM reflectivity, R(r), varied according to R(r)=0.32 * exp[−(r/2.4)$^4$] where r is the radial distance in mm from the center. The back surface of the substrate was made convex with 18.1 cm radius of curvature such that the substrate served as a lens of 30.7 cm focal length in transmission, thus forming the GRML. In this case the resonator would yield a collimated wavefront when d is adjusted such that the virtual source point P1 coincides with the focus of the GRML lens, i.e. u=30.7 cm. From Equation (5) above, d=5.8 cm. The corresponding round trip magnification is M=1.6. A 15 mm long rod of the high temperature plastic doped with 1×10$^{-4}$M PM-580 dye was used. The plane rear mirror shown in FIG. 4 makes the design particularly simple. A concave or convex mirror, in place of the plane mirror, may be used if the mirror separation is suitably adjusted. A collimated output was obtained when the flat mirror and the GRML were separated by 7 cm. The additional resonator length (1.2 cm) is accounted for by the refractive index (1.51) of the dye rod and the slight static negative lens of the rod. The frequency doubled Nd:YAG pump had a 12 mm beam diameter. The pump diameter was chosen so as keep the pump fluence below 0.25 J/cm2 for reasons of gain medium longevity. The arrangement corresponds to a Fresnel number, N~1000.

Figure 5:
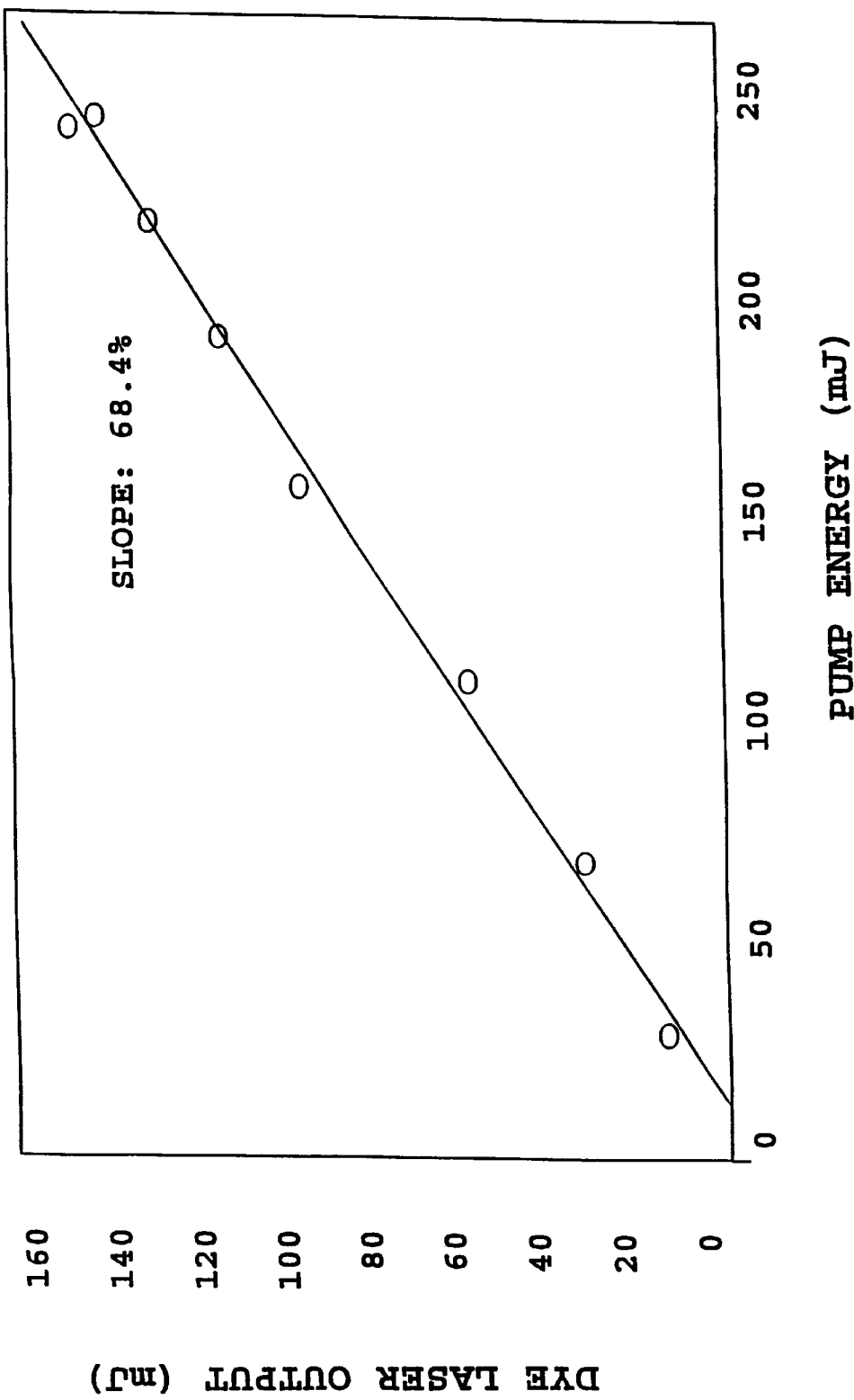
FIG. 5 is plot of pump energy versus dye laser output energy of the embodiment shown in FIG. 4.

FIG. 5 is plot of pump energy versus dye laser output energy of the working embodiment herein above described. The input-output plot as shown yields a slope efficiency of 68.4%. However, the real significance of the invention is in the intrinsic beam divergence.

The dye laser intrinsic beam divergence was examined in the far-field by focusing it with a lens on to a CCD array camera as well as by passing the focused beam through hard apertures. In the lens' focal plane, the beam profile could not be described by a simple Gaussian function but was composed of two components: a narrow bright central component surrounded by a broad diffuse pedestal. The narrow component was measured to contain 80 mJ of energy (out of a total of 142 m J) when passed through a hard aperture corresponding to a beam divergence of 10 mm-mrad. The beam divergence which would have been more than 100 mm-mrad utilizing the prior art, with a plano-parallel resonator of the present invention was reduced on the order of one tenth as much. The present invention results in a smaller length than unstable resonators encountered in the prior art, and smaller than the resonator would be if it were confocal. It is characteristic of the present invention that the ratio of fresnel number to divergence squared is at least on the order of approximately ten, resulting in a compact high brightness laser.

The narrow component is attributed to the mode formed in the GRML unstable resonator. The broad pedestal, on the other hand, is attributed to the presence of parasitics and amplified spontaneous emission (ASE) occurring because of the very high gain of the dye. It should be noted that the average GRML reflectivity is quite low—averaging only 4% over the 12 mm diameter pumped. Therefore the competing processes are able to drain away a large fraction of the optical energy in the resonator. It is expected that a larger fraction of the dye laser energy will be channeled into the narrow beam if a higher average reflectivity GRML were used. It should also be noted that use of the compact unstable resonator is not limited to just the dye lasers of the preferred embodiments. It may be used with other kinds of lasers and for resonators useful for nonlinear optical effects such as optical parametric generation (OPG) or stimulated Raman scattering (SRS).

While this invention has been described in terms of preferred embodiment consisting of the dye laser shown, those skilled in the art will recognize that the invention can be practiced with modification within the spirit and scope of the appended claims.

Having thus described my invention, what we claim as new and desire to secure by Letters Patent is as follows:

1. An outcoupler mirror device for achieving output laser beam collimation in a non-confocal laser resonator arrangement, wherein the outcoupler mirror is at one end of a laser cavity space defined between the outcoupler mirror and a rear mirror, the outcoupler mirror on its cavity side including a reflective surface area and a non-reflective surface area, such that when pump energy is input through the rear mirror there results an energization of a laser medium within the laser cavity space such that population inversion is induced and further, oscillating optical field occurs between respective reflecting surfaces of both mirrors, so that when laser beam diameter is sufficiently large, energy is passed through reduced reflectivity areas of the outcoupler mirror as un-collimated beam output, the improvement comprising:

a beam collimator positioned on the optical axis after the outcoupler cavity side, outside the laser cavity, for collimating the un-collimated beam output, whereby collimated beam output results in a ratio of fresnel number to a squared divergence on the order of ten or greater.

2. The outcoupler mirror device of claim 1 wherein the beam collimator for collimating the output beam is a positive lens positioned after the outcoupler mirror.

3. The outcoupler mirror of claim 1 wherein the beam collimator for collimating the output beam is the outcoupler shaped such that both sides form a positive lens.

4. A non-confocal laser resonator arrangement for achieving reduced output beam divergence, the arrangement comprising:

an outcoupler mirror having an output side and a cavity side, the cavity side including a surface with reflectivity varying as a function of position;

a rear mirror, such that in between the rear mirror and the outcoupler mirror is defined as a laser cavity;

a laser medium within the laser cavity, such that when pump energy is input through the rear mirror there results an energization of the laser medium within the laser cavity space so that population inversion is induced and further, oscillating optical field occurs between respective reflecting surfaces of both mirrors, so that when laser beam diameter is sufficiently large, un-collimated laser energy is passed through reduced reflectivity areas of the outcoupler mirror;

means for collimating the un-collimated beam output positioned on the optical axis after the outcoupler cavity side and outside the laser cavity, and resulting in a beam output that is collimated, whereby the collimated beam output results in a ratio of fresnel number to a squared divergence on the order of ten or greater.

5. The laser cavity arrangement of claim 4 wherein the means for collimating the output beam is a positive lens positioned after the outcoupler mirror.

6. The laser cavity arrangement of claim 4 wherein the means for collimating the output beam is shaped such that both sides form a positive lens.

7. A technique for achieving reduced laser beam divergence output from a non-confocal laser resonator arrangement including the steps of:

applying pump energy to a laser medium within a laser cavity;

energizing the laser medium within the laser cavity space so that population inversion is induced;

effecting an oscillating optical field within the laser cavity between respective reflecting surfaces at each end of the laser cavity;

outputing an un-collimated laser beam from the laser cavity, through reduced reflectivity surface areas of an outcoupler mirror as an un-collimated laser beam output;

collimating the un-collimated laser beam output thereby resulting in a laser beam output that is collimated, whereby the collimated laser beam output results in a ratio of fresnel number to a squared divergence on the order of ten or greater.

8. The technique of claim 7 wherein the collimation of the laser beam is achieved approximately simultaneously to the outputting of the laser beam.

* * * * *